United States Patent
Dunning et al.

(10) Patent No.: US 10,173,478 B2
(45) Date of Patent: *Jan. 8, 2019

(54) FILTER DEVICE

(71) Applicant: Jaguar Land Rover Limited, Coventry (GB)

(72) Inventors: Emma-Claire Dunning, Coventry (GB); Edward Hoare, Coventry (GB); Laur Läänemets, Coventry (GB); Maelle Dodu, Coventry (GB); Thuy-Yung Tran, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 45 days.

This patent is subject to a terminal disclaimer.

(21) Appl. No.: 14/917,131

(22) PCT Filed: Sep. 12, 2014

(86) PCT No.: PCT/EP2014/069499

§ 371 (c)(1),
(2) Date: Mar. 7, 2016

(87) PCT Pub. No.: WO2015/036541

PCT Pub. Date: Mar. 19, 2015

(65) Prior Publication Data

US 2016/0199768 A1    Jul. 14, 2016

(30) Foreign Application Priority Data

Sep. 12, 2013 (GB) .................................. 1316249.0

(51) Int. Cl.
*B60C 23/00* (2006.01)
*B01D 46/00* (2006.01)
*B01D 46/10* (2006.01)

(52) U.S. Cl.
CPC ............ *B60C 23/003* (2013.01); *B60C 23/00* (2013.01); *B01D 46/0012* (2013.01); *B01D 46/0023* (2013.01); *B01D 46/10* (2013.01)

(58) Field of Classification Search
CPC ........ F16H 57/02; F16H 57/027; F16K 24/04; Y10T 74/2188; B06C 23/00; B06C 23/003

(Continued)

(56) References Cited

U.S. PATENT DOCUMENTS 2,750,011 A * 6/1956 Pringle .................. F16D 65/10
                                                    188/218 A
3,167,357 A * 1/1965 Savin .................. B60B 27/0005
                                                    301/1

(Continued)

FOREIGN PATENT DOCUMENTS

JP    H01166767 A    6/1989
JP    H02174909 A1   7/1990

OTHER PUBLICATIONS

Gore: Automotive Vents for Powertrain Components—Series: AVS 41, Retrieved from the Internet: http://www.gore.com/MungoBlobs/186/617/GORE_Series_AVS_41_Powertrain.Components.pdf, Apr. 30, 2013, 2 pages.

(Continued)

*Primary Examiner* — Duane Smith
*Assistant Examiner* — Minh Chau T Pham
(74) *Attorney, Agent, or Firm* — Myers Bigel, P.A.

(57) ABSTRACT

A filter device for a conduit includes a gas-permeable pre-filter element and a gas-permeable, liquid-impermeable filter element. The filter device is configured to be fluidly coupled to a conduit such that a gas can flow, in sequence, through the pre-filter element, the filter element and then the conduit. The filter device can be used in each of a vehicle (Continued)

hollow driveshaft and a hollow wheel stub axle forming a CV joint having a compressed air supply line which passes therethrough. Compressed air can be supplied via the air supply line without the need for an additional fluid transfer device fluidly connecting the driveshaft and the stub axle's conduits.

15 Claims, 2 Drawing Sheets

(58) Field of Classification Search
USPC .......... 55/385.1, 385.4, 417; 74/607, 606 R; 137/171, 197, 198, 493, 540, 543.17, 137/543.19, 583
See application file for complete search history.

(56) References Cited

U.S. PATENT DOCUMENTS

| | | | | |
|---|---|---|---|---|
| 4,256,474 A * | 3/1981 | Berger, Jr. | ............ | B01D 29/114 220/301 |
| 4,987,937 A * | 1/1991 | Nowicke | ................. | B60C 23/00 137/550 |
| 5,053,062 A * | 10/1991 | Barris | ................... | F01N 3/0211 392/485 |
| 7,159,606 B2 * | 1/2007 | Paluncic | ................. | F16N 19/00 137/199 |
| 7,604,020 B2 * | 10/2009 | Kennedy | ............... | F16H 57/027 137/197 |
| 8,075,669 B2 | 12/2011 | Meindl et al. | | |
| 9,989,102 B2 * | 6/2018 | Dunning | ............... | B60C 23/003 |
| 2001/0043891 A1 | 11/2001 | Adiletta | | |
| 2005/0050868 A1 * | 3/2005 | Bugli | ................. | B01D 46/0023 55/482 |
| 2007/0104622 A1 | 5/2007 | Zuberi et al. | | |
| 2007/0240537 A1 * | 10/2007 | Basham | ................ | F16H 57/027 74/607 |
| 2009/0100809 A1 * | 4/2009 | Baldwin, Jr. | ...... | B01D 39/2051 55/318 |
| 2011/0074119 A1 * | 3/2011 | Deane | ...................... | F16J 3/042 277/634 |
| 2012/0067482 A1 * | 3/2012 | Stech | .................... | B60C 23/003 152/415 |
| 2016/0288589 A1 * | 10/2016 | Sidders | ................. | B60C 23/003 |

OTHER PUBLICATIONS

Combined Search and Examination Report, GB 1316249.0, dated Mar. 19, 2014, 7 pages.
Notification of Transmittal of the International Search Report and the Written Opinion, PCT/EP2014/069499, dated Nov. 28, 2014, 11 pages.

* cited by examiner

FILTER DEVICE

RELATED APPLICATIONS

This application is a 35 U.S.C. § 371 national stage application of PCT Application No. PCT/EP2014/069499, filed on Sep. 12, 2014, which claims priority from Great Britain Patent Application No. 1316249.0 filed on Sep. 12, 2013, the contents of which are incorporated herein by reference in their entireties. The above-referenced PCT International Application was published in the English language as International Publication No. WO 2015/036541 A1 on Mar. 19, 2015.

TECHNICAL FIELD

The present disclosure relates to a filter device for a conduit. In particular, but not exclusively, aspects of the present invention relate to a filter device for a conduit of a central tyre inflation system (CTIS) air supply line; to a CTIS air supply line portion; to a hollow vehicle axle; to an articulated joint; to a CTIS; to a vehicle; and to a gas supply line portion.

BACKGROUND OF THE INVENTION

The present invention was conceived in the context of on-board central tyre inflation systems (CTISs) for land based vehicles. CTISs were originally developed for military applications, in particular for military applications concerning off-road military wheeled trucks and trailers. However, CTISs are nowadays incorporated into non-military vehicles such as specialist construction equipment and some agricultural vehicles.

A CTIS typically comprises one or more compressed air sources located on-board the vehicle and connected to one or more tyres. Tyre pressure can therefore be adjusted by operating the CTIS. Typically, a CTIS provides for delivery of compressed air to a tyre supply line. In some examples, the supply line is integrated into a vehicle axle. Some axles comprise articulated joints having a driveshaft and a stub axle connected to form a constant velocity (CV) joint, and the compressed air supply line extends through the CV joint. The CV joint is typically protected by a CV joint gaiter. An example of such an axle is described in US 2012/0067482 A1, to Mr Clyde Stech of Fleet Air, LLC.

Air supplied through the CV joint to inflate or deflate the tyre may leak into the CV joint enclosure delimited by the gaiter and thus inflate the gaiter. This is not desirable, and vented gaiters have been proposed to equalise pressure. However, vented gaiters need to be kept unobstructed to vent air efficiently. The present invention seeks to provide an alternative solution to vented gaiters.

U.S. Pat. No. 8,075,669 B2 discloses a gas-permeable oleophobic material.

EP 2,007,500 B1 discloses a vent for an enclosure containing lubricated machinery.

WL Gore & Associates, Inc., supplies the series AVS 41 automotive vents for powertrain components. An AVS 41 vent comprises a body, a membrane, a pre-filter and a cap. When the vent is installed in a venting opening, air is vented in sequence through a conduit, through the pre-filter and through the membrane. The membrane is located after the pre-filter with respect to the venting direction.

It is against this background that the present invention has been conceived. In at least certain embodiments, the present invention seeks to address shortcomings associated with the prior art or to improve parts, components, apparatus, systems and methods disclosed in the prior art.

SUMMARY

Aspects of the present invention relate to a filter device for a conduit; to a central tyre inflation system (CTIS) air supply line portion; to a hollow vehicle axle; to an articulated joint; to a CTIS; to a vehicle; and to a gas supply line portion.

According to an aspect of the present invention, there is provided a filter device for a conduit, the filter device comprising:
 a gas-permeable pre-filter element; and
 a gas-permeable, liquid-impermeable filter element;
wherein the filter device is configured to be fluidly coupled to a conduit such that, in use, a gas can be caused to flow, in sequence, through the pre-filter element, through the filter element, and through the conduit.

Ingress of liquid, or any other similar substance, into the conduit can thus be inhibited by the filter device, while a gas can still flow into and through the conduit. A gas can be caused to flow, in sequence, through the pre-filter filter element, the filter element and then through the conduit, while a liquid, or a similar substance, cannot follow the same path, i.e. are kept out of the conduit or out of inner parts of the conduit, as the case may be.

In some embodiments, the gas-permeable, liquid-impermeable filter element can keep liquids (for example a lubricant, such as grease or oil) out of inner portions of the conduit, i.e. portions located beyond or past the filter device proceeding inwardly into the conduit. A port can be located at an end of the conduit for allowing fluid in or out of the conduit. The filter can be provided at or near said end and/or port. It will be appreciated that although the term pre-filter is used herein, this has no implication on the allowed direction of gas flow. The filter device of the present invention allows a gas to flow through the device in both directions since the pre-filter element and the filter element are each gas-permeable. On the contrary, liquid is not permitted to flow into the conduit, or into inner parts of the conduit, since the filter element is liquid-impermeable.

In some embodiments, the pre-filter element comprises a porous or fibrous material. It will be understood that any materials which can at least partially inhibit progress of a liquid or similar substance towards the filter element can be used. The porous material can be foam, or a sponge.

The filter element comprises a gas-permeable, liquid-impermeable membrane. The membrane can be oleophobic.

The filter device can have a cylindrical or at least generally cylindrical shape, so that it can be inserted partially or fully into the port and/or end of the conduit.

The port of the conduit and/or the conduit can be circular, or at least generally circular. In some embodiments, a diameter of the port and/or of the conduit is in the range 3 mm to 20 mm.

The port can be transversal with respect to a longitudinal axis defined by the conduit.

The filter device can be configured to be disposed within said conduit and/or within said port, but other configurations are also possible. The filter device can be disposed fully inside the conduit. The filter device can be part of a cartridge device which can be fluidly coupled to the port and/or the conduit so that the filter element and the pre-filter element of the filter device are located outside the conduit and/or port. The filter can be coaxially coupled to the conduit and/or to the port.

The filter element can be adjacent to, in contact with, or supported by the pre-filter element. In some embodiments, the filter element is constituted by a membrane supported by rigid foam which constitutes the pre-filter material.

The pre-filter element can have a longitudinal thickness greater than a longitudinal thickness of the filter element.

According to another aspect of the present invention, there is provided a hollow vehicle axle comprising a filter device as described herein.

According to another aspect of the present invention, there is provided an articulated joint comprising:
  first and second hollow vehicle axles each having a respective internal conduit for passage of gas;
  an enclosure in fluid communication with each of the conduits; and
  first and second gas-permeable, liquid-impermeable filter devices;
  wherein the first filter device is fluidly coupled to the first conduit and the second filter device is fluidly coupled to the second conduit.

At least one of the first and second filter devices can be a filter device as described herein. The articulated joint can be a constant velocity (CV) joint. The CV joint can comprise a gaiter. The gaiter can define said enclosure, optionally in cooperation with one or both of the hollow vehicle axles which can be, respectively, a driveshaft and a wheel stub axle. The first filter device can be coupled to the driveshaft such that, during tyre inflation, compressed air passes first through the filter element and successively through the pre-filter element. The second filter device can be coupled to the stub axle such that during tyre inflation, compressed air passes first through the pre-filter element and successively through the filter element and then through the internal conduit of the stub axle. In other words, the first and second filter devices can be coupled respectively to the driveshaft and to the wheel stub axle such that the pre-filter element faces the CV joint enclosure.

According to another aspect of the present invention there is provided a central tyre inflation system (CTIS) air supply line portion comprising:
  a conduit for passage of air for inflating a tyre; and
  a filter device as described herein;
  wherein the filter device is fluidly coupled to said conduit.

The filter device can be disposed within said conduit and/or said port. The filter device can be interference fitted to said port and/or to the conduit. The filter device can be fully or partially inserted into said conduit and/or port.

The filter device can be securely, and/or removably and/or sealingly coupled to said port and/or conduit, so that any fluid passing through the conduit and/or port is caused to pass through the filter device.

The conduit can extend along a longitudinal axis and the port can be disposed transversally, substantially transversally or at right angles with respect to said longitudinal axis.

In some embodiments, at least a portion of said conduit extends through a vehicle axle, which is thus a hollow vehicle axle. The filter device can therefore be used to protect inner portions of the conduit and/or the axle from ingress of liquid (for example a lubricant, such as oil or grease).

The filter device can be disposed such that a face of the filter device is substantially level with a surface or an end surface of the vehicle axle. This can make the filter visible to an operator and in some cases can facilitate inspection, replacement and/or servicing of the filter.

The filter device can be coupled to an end of said vehicle axle. In some embodiments, the vehicle axle is a vehicle driveshaft. The filter device can be coupled to an, in use, outer end of the driveshaft. The vehicle axle can be a wheel stub axle. The filter device can be coupled to an, in use, inner end of the wheel stub axle.

According to another aspect of the present invention there is provided a CTIS air supply line portion comprising:
  first and second conduits for passage of air for inflating a tyre;
  first and second gas-permeable liquid-impermeable filter devices; and
  an enclosure in fluid communication with each of the first and second conduits;
  wherein the first filter device is fluidly coupled to the first conduit, and the second filter device is fluidly coupled to the second conduit.

The first and second filter devices can each be as described herein.

The enclosure can accommodate a liquid, or a lubricant, for example grease or oil. The enclosure can accommodate bearings or bearing surfaces. The bearing surfaces can be moveable relative one to another.

A portion of said first conduit can extend through a driveshaft.

A portion of said second conduit can extend through a wheel stub axle.

The first filter device can be coupled to an, in use, outer end of the driveshaft and the second filter device can be coupled to an, in use, inner end of the wheel stub axle.

In some embodiments, the driveshaft and the wheel stub axle form a constant velocity (CV) joint. The CV joint can comprise a gaiter. The gaiter can define said enclosure, optionally in cooperation with the driveshaft and/or the wheel stub axle.

The gaiter can comprise a gaiter reinforcing element. The gaiter reinforcing element can be a ring, a mesh or a woven fibre material.

The CV joint can comprise a clearing means for clearing lubricant from a region close or proximate to the first and/or the second filter devices. The clearing means can be configured to clear lubricant from a region close or proximate to one or more faces (or ends) of the filter device(s). In some embodiments, the clearing means is configured to be activated (i.e. to perform its clearing function) when the CV joint articulates. The clearing means can comprise a wiper supported by the driveshaft, or by the end of the driveshaft enclosed by the gaiter. The wiper can wipe the one or more faces (or ends) of the filter device(s). The wiper can be made of a flexible material chosen so as not to cause scoring or surface damage to the gas-permeable liquid-impermeable membrane. Alternatively, the clearing means can comprise an agitator supported by the driveshaft, or by the end of the driveshaft enclosed by the gaiter. The agitator can be configured to displace accumulated grease from the one or more faces (or ends) of the filter devices.

According to another aspect of the present invention there is provided a CTIS comprising a CTIS air supply line portion as described herein, and/or a hollow vehicle axle shaft as described herein, and/or an articulated joint as described herein.

According to another aspect of the present invention there is provided a vehicle comprising a CTIS as described herein.

According to another aspect of the present invention, there is provided a gas supply line portion comprising:
  first and second conduits;
  first and second gas-permeable, liquid-impermeable filter devices; and an enclosure for holding a liquid, said enclosure being in fluid communication with said first and second conduits;

wherein the first filter is fluidly coupled to said first conduit and the second filter is fluidly coupled to said second conduit.

The first and the second filters devices can each be as described herein.

Thus, in use, a gas can be caused to flow according to the following sequence: through the first filter; through the enclosure; through the second filter. Inner portions of the conduits are accordingly protected from contact with any liquid and/or other undesired substance that may be present in the enclosure.

Unless indicated to the contrary, references herein to a liquid are to be interpreted as including substances which are highly viscous or semisolid. The skilled person will understand that the grease, oil and synthetic lubricants are to be interpreted as liquids within the meaning of the present application.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
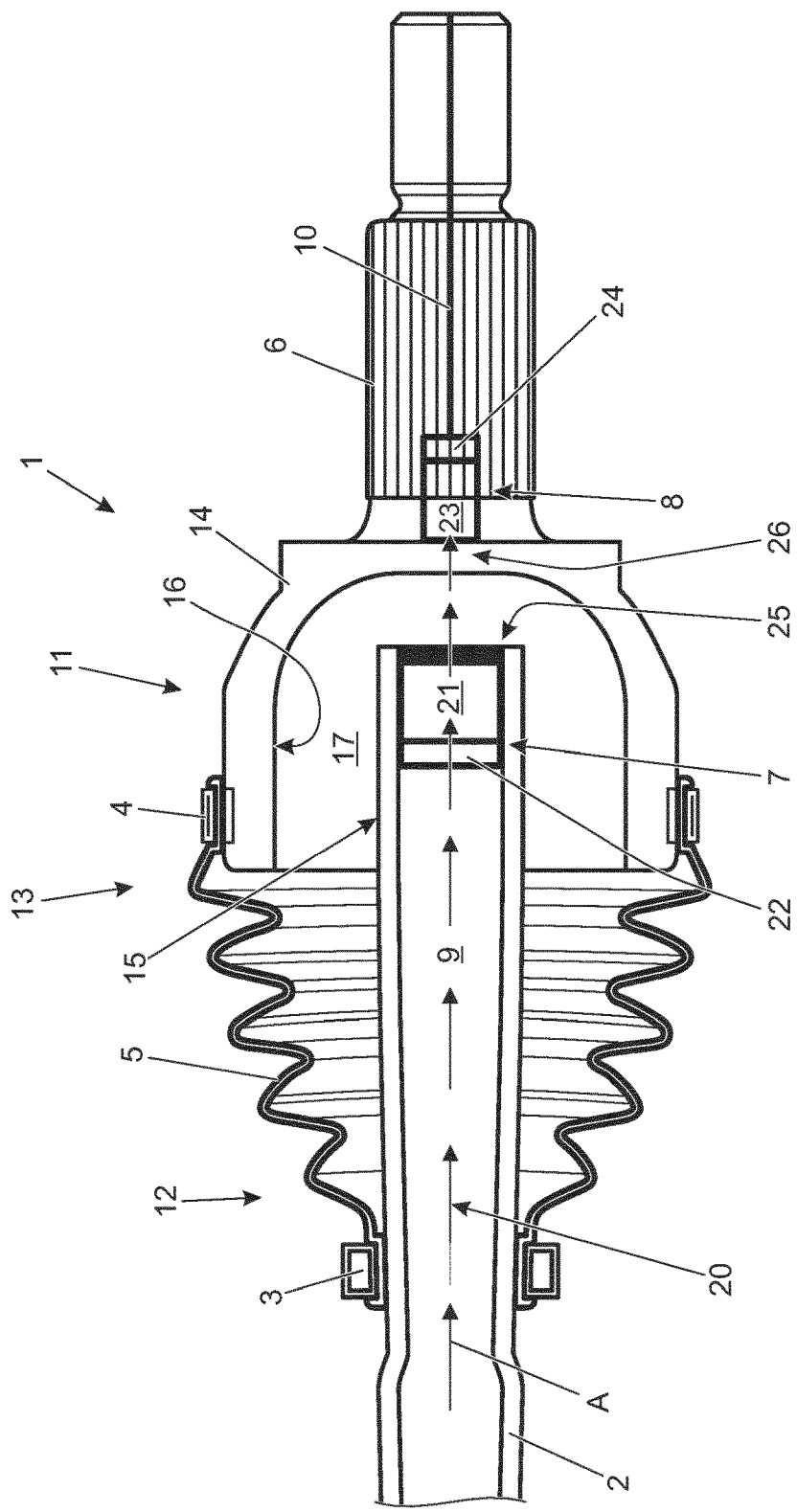
FIG. 1 is a cross sectional side elevation of a vehicle axle assembly according to an embodiment of the present invention.

With reference to FIG. 1, a vehicle axle assembly 1 comprises: a driveshaft 2; first and second gaiter clamps 3, 4; a gaiter 5; a wheel stub axle 6; and first and second air filters 7, 8. The driveshaft 2 is a hollow shaft having a first internal conduit 9 extending therethrough to allow internal passage of compressed air from a compressed air source (not shown) located on-board the vehicle (not shown). The stub axle 6 is also a hollow shaft, and a second internal conduit 10 extends therethrough to transfer compressed air towards a wheel (not shown). The CTIS, tyre and wheel are not shown in the drawings and are of the type described in the co-pending patent application number GB1313622.1 filed on 30 Jul. 2013, the contents of which are incorporated herein in their entirety by reference.

It will be appreciated that the driveshaft 2 and the wheel stub axle form a constant velocity (CV) joint 11, although the internal parts of the CV joint 11 are not shown in FIG. 1 for clarity of representation. The CV joint 11 articulates in response to a driver steering input. The driveshaft 2 receives torque from a differential box (not shown) and transmits said torque through the CV joint 11 to the wheel stub axle 6.

A first end 12 of the gaiter 5 is mounted to the driveshaft 2 and a second end 13 of the gaiter 5 is mounted to a cup-shaped portion 14 of the stub axle 6. Thus, the gaiter 5 and cup-shaped portion 14 define at least in part an enclosure 17 for a lubricant, such as grease or oil, in cooperation with an outer surface 15 of the driveshaft 2 and an inner surface 16 of the cup-shaped portion 14.

An on-board central tyre inflation system (CTIS) air supply line portion 20 is defined within the vehicle axle assembly 1 shown in FIG. 1. This supply line portion 20 comprises: the first internal conduit 9 of the driveshaft 2; the enclosure 17 defined by the gaiter 5; and the second internal conduit 10 of the wheel stub axle 6. Thus, compressed air for inflating a tyre (not shown) mounted on the wheel can be generated by the compressed air source and can be caused to pass first through the first internal conduit 9, then through the enclosure 17 and, finally, through the second internal conduit 10. Arrows 'A' indicate airflow towards the tyre (not shown). It will be appreciated that the airflow may be bi-directional in use. The flow in the opposite direction represents a tyre deflation mode. When the tyre is deflated, air from the tyre flows back first through the second internal conduit 10, then through the enclosure 17 and, finally, through the first internal conduit 9. In this manner, air can be passed through the CV joint 11, in both directions, without being contaminated by lubricant present in the enclosure 17, thus lubricant contained in the enclosure 17 is prevented from entering inner portions of the first and second conduits 9, 10 due to the filtering effect of the first and second air filters 7, 8.

In the present embodiment the first and second air filters 7, 8 each consist of a pre-filter element 21, 23 and a filter element 22, 24. The pre-filter element 21, 23 is in the form of a cylindrical portion of hard, porous foam. In the described embodiment, the filter element is in the shape of a thin membrane of a gas-permeable, liquid-impermeable oleophobic material. Suitable materials for the membrane are described for example in U.S. Pat. No. 8,075,669 B2. The function of the pre-filter element 21, 23 is to allow air through the conduits 9, 10 while providing a physical obstacle for ingress of lubricant towards the membrane 22, 24. In the described embodiment, the air filters 7, 8 are push fitted into the conduits 9, 10 via respective conduit ports 25, 26. The conduit ports 25, 26 are in fluid communication with the enclosure 17. In the described embodiment, the filters 7, 8 are axially positioned along the respective longitudinal axes of the driveshaft 2 and the wheel stub axle 7 so as to be flush, or level, with said ports 25, 26. However, the skilled person will appreciate that the filters 7, 8 could be axially located further inside the conduits 9, 10. It will also be apparent that the protected portions of the conduits 9, 10 are those located past the membranes 22, 24 proceeding from the ports 25, 26 inwardly into the conduits 9, 10. Should any lubricant come into contact with the membranes 22, 24, it will be repelled by the membranes 22, 24 due to their oleophobic properties.

During a tyre inflation operation, compressed air passes in sequence through the first conduit 9; through the membrane 22 of the first filter 7; through the pre-filter element 21 of the first filter 7; through the port 25 of the first conduit 9; through the enclosure 17; through the port 26 of the second conduit 10; through the pre-filter element 23 of the second filter 8; through the membrane 24 of the second filter 8; and, finally, through the second conduit 10.

A first end 29 of the driveshaft 2 is disposed inside the CV joint enclosure 17 and receives the first filter 7. This filter 7 is securely and sealingly fitted to the conduit 9 so as to ensure all the air that passes to or from the conduit 9 in the driveshaft 2 passes through the filter 7. The same considerations apply to the second filter 8. Thus, the cup-shaped portion 14 of the stub axle 6 receives the second filter 8. This filter 8 is securely and sealingly fitted to the second conduit 10 so as to ensure all the air that passes to or from the conduit 10 in the stub axle passes through the filter 8.

Figure 2:
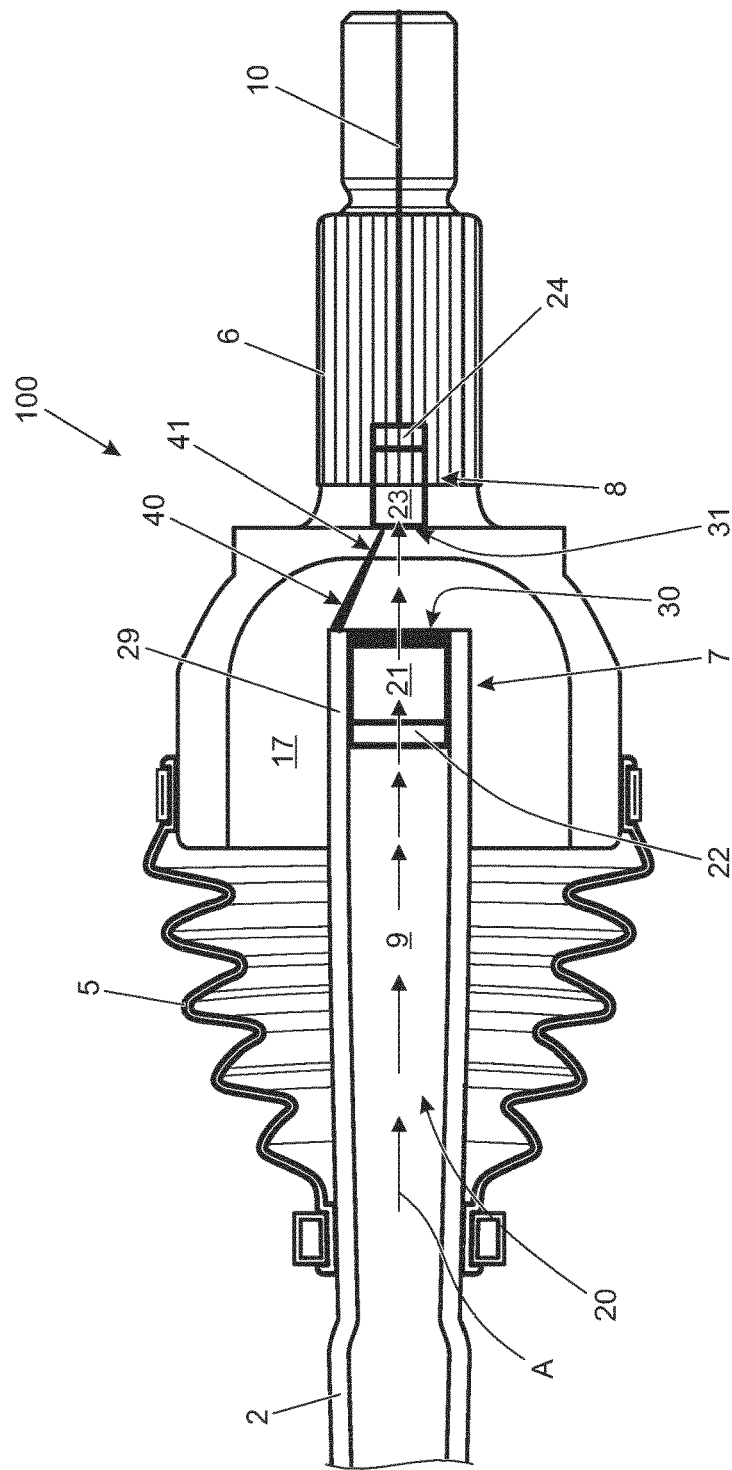
FIG. 2 is a cross sectional side elevation of a vehicle axle assembly according to another embodiment of the present invention.

Since the air flow is focused through the first conduit 9 and the first air filter 7, the air flow may dislodge any lubricant which might accumulate around, or become impregnated into, the first pre-filter element 23, or that might become deposited on a first pre-filter element face 30 facing the enclosure 17. When the air flow enters the enclosure 17, however, the air flow is dispersed to some extent. Accordingly, the same air flow might not be sufficient to dislodge any deposits of lubricant that might have deposited on a second pre-filter element face 31 facing the enclosure 17. FIG. 2 shows a similar embodiment of vehicle axle assembly 100 (compared to that shown in FIG. 1) comprising a clearing device in the shape of a wiper blade 40. Like reference numerals are used in FIG. 2 to denote like components with respect to those shown in FIG. 1.

With reference to FIG. 2 the wiper blade 40 is rigidly fixed to said driveshaft end 29 located inside the enclosure 17 defined by the gaiter 5. More specifically, the wiper blade 40 is a longitudinal projection extending at an angle with respect to the longitudinal axis of the driveshaft 2. The wiper blade 40 comprises a soft tip 41 made of a flexible resilient material. In the described embodiment, this material is rubber. In use, the soft tip 41 is caused to gently wipe across the second pre-filter face 31 by the articulation of the CV joint 11. It will be appreciated that a similar device could be provided, if necessary, on the inner surface 16 of the cup-shaped portion 14 to clean the first pre-filter element face 30.

Typically, air passing through the CTIS air supply line portion 20 is at a pressure of about 2 bars or above. At least in certain embodiments, the gaiter 5 is reinforced compared to traditional gaiters. The purpose of the reinforced gaiter is to withstand the pressure that may build up in the enclosure 17 in conjunction with passage of air for inflating/deflating the tyre. Various reinforcement solutions are possible, but the gaiters 5 depicted in FIGS. 1 and 2 comprise a fibre mesh of a suitable material such as, for example, steel, nylon or polyester, which encapsulates the pleated profiles of the gaiters 5. It will be appreciated that other solutions are possible. For example, the gaiters 5 could be made of 3D woven fibres embedded into a rubber or rubber-like substrate. The reinforced gaiters 5 described in FIGS. 1 and 2 can withstand the air pressure that is introduced into the CV joint 11 effectively without deformation. The vehicle axle assemblies 1, 100 of FIGS. 1 and 2 can thus rotate within the same space allocated for conventional axle assemblies.

Typically, the first and second conduits 9, 10 are sized to allow passage of air (in both directions, depending on whether the CTIS air supply line portion 20 is used in tyre inflate or tyre deflate mode) according to flow rates in the region of 30 liters per minute at a pressure of approximately 2 bar above atmospheric pressure. In the described embodiment, the first conduit 9 is approximately 15 mm, and the second conduit is approximately 5 mm. Other pressures, flow rates and/or dimensions are useful and may be varied to best suit a specific vehicle application.

While the invention has been described herein with reference to a CTIS air supply line portion 20 extending through a vehicle axle assembly 1, 100 comprising a CV joint 11, it will be appreciated that the invention can equally be implemented in other applications contemplating passage of gas through first and second conduits each in fluid communication with an enclosure where a liquid (for example a lubricant, such as oil or grease) is held. The arrangement of the filters 7, 8 illustrated in FIGS. 1 and 2, with the gas-permeable liquid-impermeable membranes 22, 24 protecting inner parts of the conduits 9, 10 (and upstream components) from contact with the lubricant present in the enclosure 17 achieves this purpose.

Further changes and modifications can be made to the air filters 7, 8 described herein without departing from the present invention. For example, an additional pre-filter element could be provided on the other side of the filter element 22, 24. The filter element 22, 24 could be operatively disposed between first and second pre-filter elements.

The invention claimed is:

1. A filter device for a conduit of an air supply line portion of a central tyre inflation system (CTIS), the filter device comprising:
   a gas-permeable pre-filter element; and
   a gas-permeable, liquid-impermeable filter element;
   wherein the filter device is configured to be fluidly coupled to the conduit such that air supplied via said air supply line portion flows, in sequence, through the pre-filter element, through the filter element, and through the conduit; and
   wherein the filter element is configured to be disposed within the conduit.

2. The filter device of claim 1, wherein the pre-filter element comprises a porous and/or fibrous material, and wherein said porous or fibrous material is foam, or a sponge.

3. The filter device according to claim 1, wherein the filter element comprises a gas-permeable, liquid-impermeable membrane, and wherein the membrane is oleophobic.

4. The filter device of claim 1, wherein the filter device is cylindrical.

5. The filter device of claim 1, wherein the pre-filter element is configured to be disposed within said conduit and/or a port of said conduit.

6. The filter device of claim 1, wherein the filter element is adjacent to, in contact with, or supported by the pre-filter element.

7. The filter device of claim 1, wherein the pre-filter element has a longitudinal thickness greater than a longitudinal thickness of the filter element.

8. A central tyre inflation system (CTIS) air supply line portion, comprising:
   a conduit for passage of air for inflating a tyre; and
   a filter device comprising:
      a gas-permeable pre-filter element; and
      a gas-permeable, liquid-impermeable filter element;
   wherein the filter device is configured to be fluidly coupled to the conduit such that air supplied via said air supply line portion flows, in sequence, through the pre-filter element, through the filter element, and through the conduit;
   wherein the filter element is configured to be disposed within the conduit; and
   wherein the filter device is fluidly coupled to said conduit.

9. The CTIS air supply line portion of claim 8, wherein the filter device is at least partially inserted into the conduit and/or wherein at least a portion of the conduit extends through a vehicle axle.

10. The CTIS air supply line portion of claim 9, wherein a face of the pre-filter element is substantially level with an end surface of the vehicle axle, and wherein the vehicle axle is a driveshaft or a wheel stub axle.

11. An articulated joint comprising:
   first and second hollow vehicle axles, each having a respective internal conduit for passage of gas;
   first and second gas-permeable, liquid-impermeable filter devices; and
   an enclosure in fluid communication with said first and second conduits;
   wherein the first and second filter devices each comprise a gas-permeable pre-filter element and a gas-permeable, liquid-impermeable filter element;
   wherein the first filter device is fluidly coupled to the first conduit such that a gas can flow in sequence through the first filter device pre-filter element, through the first filter device filter element, and through the first conduit,
   wherein the second filter device is fluidly coupled to the second conduit such that a gas can flow in sequence through the second filter device pre-filter element, through the second filter device filter element, and through the second conduit; and,
   wherein the first and second filter elements are disposed within said first and second conduits, respectively.

12. The articulated joint of claim 11, further comprising a clearing device that clears lubricant from one or more regions close to the first and/or the second filter devices.

13. The articulated joint of claim 12, wherein the clearing device is configured to be activated when the articulated joint articulates, and wherein the clearing device comprises a wiper supported by an end of the first or second hollow vehicle axle.

14. A central tyre inflation system (CTIS), comprising the CTIS air supply line portion of claim 8.

15. A vehicle comprising the filter device of claim 1.

* * * * *